(12) United States Patent
Zalmanovitch et al.

(10) Patent No.: US 10,069,705 B2
(45) Date of Patent: Sep. 4, 2018

(54) DATA USAGE PROFILES FOR USERS AND APPLICATIONS

(71) Applicant: Microsoft Technology Licensing, LLC, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: DATA USAGE PROFILES FOR USERS AND APPLICATIONS, Redmond, WA (US)

(*) Notice: Subject to any disclaimer, the term of this patent is extended or adjusted under 35 U.S.C. 154(b) by 0 days.

(21) Appl. No.: 15/365,919

(22) Filed: Nov. 30, 2016

(65) Prior Publication Data

US 2017/0086053 A1 Mar. 23, 2017

Related U.S. Application Data (63) Continuation of application No. 13/721,029, filed on Dec. 20, 2012, now Pat. No. 9,544,212.

(Continued)

(51) Int. Cl.
*H04L 12/26* (2006.01)
*H04M 15/00* (2006.01)
(Continued)

(52) U.S. Cl.
CPC ...... *H04L 43/0876* (2013.01); *H04L 12/1435* (2013.01); *H04L 43/045* (2013.01);
(Continued)

(58) Field of Classification Search
CPC ........... H04W 4/00; H04W 4/24; H04W 8/18; H04W 4/26; H04W 24/02; H04L 43/04;
(Continued)

(56) References Cited

U.S. PATENT DOCUMENTS 5,778,182 A 7/1998 Cathey et al.
6,308,328 B1 10/2001 Bowcutt et al.
(Continued)

FOREIGN PATENT DOCUMENTS

CN 1317745 A 10/2001
CN 101401391 A 4/2009
(Continued)

OTHER PUBLICATIONS

"Notice of Allowance Issued in European Patent Application No. 13741633.5", dated Aug. 6, 2015, 5 Pages.
(Continued)

*Primary Examiner* — Magdi Elhag (57) ABSTRACT

Embodiments profile users and applications based on network data usage. Data usage statistics are collected and compared for the users and applications. Profiles are assigned to the users and applications based on the comparison. In some embodiments, the applications are ranked based on data usage and presented to the users in an application marketplace.

20 Claims, 6 Drawing Sheets

Related U.S. Application Data (60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.

| | | |
|---|---|---|
| *H04W 4/60* | (2018.01) | |
| *H04L 12/14* | (2006.01) | |
| *H04W 4/24* | (2018.01) | |
| *H04W 4/00* | (2018.01) | |
| *H04W 8/18* | (2009.01) | |
| *H04M 1/725* | (2006.01) | |
| *H04W 88/06* | (2009.01) | |

(52) U.S. Cl.
CPC .......... *H04L 43/062* (2013.01); *H04M 15/41* (2013.01); *H04M 15/58* (2013.01); *H04M 15/60* (2013.01); *H04M 15/765* (2013.01); *H04M 15/7652* (2013.01); *H04M 15/80* (2013.01); *H04M 15/83* (2013.01); *H04M 15/84* (2013.01); *H04M 15/846* (2013.01); *H04M 15/85* (2013.01); *H04M 15/853* (2013.01); *H04M 15/854* (2013.01); *H04M 15/86* (2013.01); *H04W 4/003* (2013.01); *H04W 4/24* (2013.01); *H04W 4/60* (2018.02); *H04W 8/186* (2013.01); *H04M 1/72522* (2013.01); *H04M 15/775* (2013.01); *H04M 15/8044* (2013.01); *H04M 15/856* (2013.01); *H04W 8/18* (2013.01); *H04W 88/06* (2013.01)

(58) Field of Classification Search
CPC ............. H04L 43/0876; H04L 12/1403; H04L 41/5029; H04L 41/5067; H04M 15/58; H04M 15/83; H04M 15/84; H04M 15/85
See application file for complete search history.

(56) References Cited

U.S. PATENT DOCUMENTS

| | | | |
|---|---|---|---|
| 7,103,740 | B1 | 9/2006 | Colgrove et al. |
| 7,184,749 | B2 | 2/2007 | Marsh et al. |
| 7,277,938 | B2 | 10/2007 | Duimovich et al. |
| 7,320,131 | B1 | 1/2008 | O'Toole, Jr. |
| 7,406,596 | B2 | 7/2008 | Tararukhina et al. |
| 7,418,532 | B2 | 8/2008 | Suzuki et al. |
| 7,532,571 | B1 | 5/2009 | Price et al. |
| 7,720,727 | B2 | 5/2010 | Keyes et al. |
| 7,904,080 | B2 | 3/2011 | Atkins et al. |
| 7,986,935 | B1 | 7/2011 | D'Souza et al. |
| 8,064,876 | B2 | 11/2011 | Knight |
| 8,160,598 | B2 | 4/2012 | Savoor |
| 8,255,731 | B1 | 8/2012 | Alsina et al. |
| 8,359,389 | B1 | 1/2013 | Cohen et al. |
| 8,407,721 | B2 | 3/2013 | Dyba et al. |
| 8,484,568 | B2 | 7/2013 | Rados et al. |
| 8,542,661 | B2 | 9/2013 | Moeller et al. |
| 8,572,256 | B2 | 10/2013 | Babbar |
| 8,689,541 | B2 | 4/2014 | McDonald et al. |
| 8,880,022 | B2 * | 11/2014 | Agarwal ............ H04L 12/141 455/405 |
| 8,924,352 | B1 | 12/2014 | Andruss et al. |
| 9,154,550 | B1 | 10/2015 | Abgrall et al. |
| 9,544,212 | B2 * | 1/2017 | Zalmanovitch ....... H04L 43/045 |
| 2002/0029273 | A1 | 3/2002 | Haroldson et al. |
| 2002/0082991 | A1 | 6/2002 | Friedman et al. |
| 2002/0090926 | A1 | 7/2002 | Pirkola et al. |
| 2003/0066055 | A1 | 4/2003 | Spivey |
| 2003/0115385 | A1 | 6/2003 | Adamane et al. |
| 2003/0181242 | A1 | 9/2003 | Lee et al. |
| 2003/0186706 | A1 | 10/2003 | Bergins et al. |
| 2004/0032828 | A1 | 2/2004 | Satt et al. |
| 2004/0040021 | A1 | 2/2004 | Bharati et al. |
| 2004/0111712 | A1 | 6/2004 | Humpert et al. |
| 2004/0153587 | A1 | 8/2004 | Choi |
| 2004/0176965 | A1 | 9/2004 | Winch et al. |
| 2004/0199634 | A1 | 10/2004 | Jackowski et al. |
| 2005/0052992 | A1 | 3/2005 | Cloonan et al. |
| 2005/0238047 | A1 | 10/2005 | Holland et al. |
| 2006/0141983 | A1 | 6/2006 | Jagannathan et al. |
| 2006/0211404 | A1 | 9/2006 | Cromp et al. |
| 2006/0277224 | A1 | 12/2006 | Aftab et al. |
| 2007/0211674 | A1 | 9/2007 | Ragnar Karlberg et al. |
| 2007/0294562 | A1 | 12/2007 | Takamatsu et al. |
| 2008/0168245 | A1 | 7/2008 | De Atley et al. |
| 2008/0250083 | A1 | 10/2008 | Kovacs et al. |
| 2008/0311912 | A1 | 12/2008 | Balasubramanian et al. |
| 2008/0318621 | A1 | 12/2008 | Fan et al. |
| 2009/0054030 | A1 | 2/2009 | Golds |
| 2009/0068980 | A1 | 3/2009 | Creswell et al. |
| 2009/0068984 | A1 | 3/2009 | Burnett |
| 2009/0081996 | A1 | 3/2009 | Duggal et al. |
| 2009/0138427 | A1 | 5/2009 | Kalavade |
| 2009/0172275 | A1 | 7/2009 | Nochimowski et al. |
| 2009/0196302 | A1 | 8/2009 | Pastorino et al. |
| 2009/0199196 | A1 | 8/2009 | Peracha |
| 2009/0203352 | A1 | 8/2009 | Fordon et al. |
| 2009/0285201 | A1 | 11/2009 | Ben-Haim et al. |
| 2010/0015926 | A1 | 1/2010 | Luff |
| 2010/0017506 | A1 | 1/2010 | Fadell |
| 2010/0035576 | A1 | 2/2010 | Jones et al. |
| 2010/0130163 | A1 | 5/2010 | Pousti |
| 2010/0141009 | A1 | 6/2010 | Kirch et al. |
| 2010/0159948 | A1 | 6/2010 | Spivey et al. |
| 2010/0180190 | A1 | 7/2010 | Carroll |
| 2010/0191612 | A1 | 7/2010 | Raleigh |
| 2010/0318647 | A1 | 12/2010 | Savoor et al. |
| 2011/0019566 | A1 | 1/2011 | Leemet et al. |
| 2011/0047620 | A1 | 2/2011 | Mahaffey et al. |
| 2011/0070898 | A1 | 3/2011 | Sanjeev et al. |
| 2011/0087985 | A1 | 4/2011 | Buchanan et al. |
| 2011/0137776 | A1 | 6/2011 | Goad et al. |
| 2011/0145920 | A1 | 6/2011 | Mahaffey et al. |
| 2011/0151831 | A1 | 6/2011 | Pattabiraman |
| 2011/0176482 | A1 | 7/2011 | Vizor et al. |
| 2011/0208857 | A1 | 8/2011 | Gentile et al. |
| 2011/0211465 | A1 | 9/2011 | Farrugia et al. |
| 2011/0231551 | A1 | 9/2011 | Hassan et al. |
| 2011/0238826 | A1 | 9/2011 | Carre et al. |
| 2011/0244826 | A1 | 10/2011 | Krishnan et al. |
| 2011/0275344 | A1 | 11/2011 | Momtahan et al. |
| 2011/0276442 | A1 | 11/2011 | Momtahan et al. |
| 2011/0276823 | A1 | 11/2011 | Ueno et al. |
| 2011/0300865 | A1 | 12/2011 | Kashikar et al. |
| 2012/0023189 | A1 | 1/2012 | Giaretta et al. |
| 2012/0054661 | A1 | 3/2012 | Rados et al. |
| 2012/0064908 | A1 | 3/2012 | Fox et al. |
| 2012/0064923 | A1 | 3/2012 | Imes et al. |
| 2012/0101952 | A1 | 4/2012 | Raleigh et al. |
| 2012/0108200 | A1 | 5/2012 | Rubin et al. |
| 2012/0142310 | A1 | 6/2012 | Pugh et al. |
| 2012/0150808 | A1 | 6/2012 | Hubner et al. |
| 2012/0155296 | A1 | 6/2012 | Kashanian |
| 2012/0158947 | A1 | 6/2012 | Hassan et al. |
| 2012/0163232 | A1 | 6/2012 | Yoo |
| 2012/0198046 | A1 | 8/2012 | Shah et al. |
| 2012/0208495 | A1 | 8/2012 | Lawson et al. |
| 2012/0278194 | A1 | 11/2012 | Dewan et al. |
| 2012/0290584 | A1 | 11/2012 | De Bona et al. |
| 2012/0303823 | A1 | 11/2012 | Nair et al. |
| 2012/0311176 | A1 | 12/2012 | Dellinger et al. |
| 2012/0315872 | A1 | 12/2012 | Amato et al. |
| 2013/0023230 | A9 | 1/2013 | Momtahan et al. |
| 2013/0028143 | A1 | 1/2013 | Vasseur et al. |
| 2013/0035059 | A1 | 2/2013 | Liu et al. |
| 2013/0054378 | A1 | 2/2013 | Hao et al. |
| 2013/0060653 | A1 | 3/2013 | Sharkey |
| 2013/0064106 | A1 | 3/2013 | Sylvain |
| 2013/0115940 | A1 | 5/2013 | Zhou et al. |
| 2013/0117846 | A1 | 5/2013 | Mahaffey et al. |
| 2013/0122882 | A1 | 5/2013 | Patel et al. |

(56) References Cited

U.S. PATENT DOCUMENTS

| | | | |
|---|---|---|---|
| 2013/0136067 | A1 | 5/2013 | Praveenkumar et al. |
| 2013/0149994 | A1 | 6/2013 | Gaddam et al. |
| 2014/0301218 | A1 | 10/2014 | Luo et al. |

FOREIGN PATENT DOCUMENTS

| | | | |
|---|---|---|---|
| CN | 101553797 A | | 10/2009 |
| CN | 101895967 A | | 11/2010 |
| JP | 2003299150 A | | 10/2003 |
| JP | 2003338856 A | | 11/2003 |
| JP | 2004072590 A | | 3/2004 |
| JP | 2004140684 A | | 5/2004 |
| JP | 2005168041 A | | 6/2005 |
| JP | 2010103892 A | | 5/2010 |
| JP | 2010531565 A | | 9/2010 |
| JP | 2011124617 A | | 6/2011 |
| WO | 2006004784 A1 | | 1/2006 |
| WO | 2008097105 A1 | | 8/2008 |
| WO | 2008155444 A1 | | 12/2008 |
| WO | 2011139923 A2 | | 11/2011 |
| WO | 2012083285 A2 | | 6/2012 |
| WO | 2012162419 A2 | | 11/2012 |
| WO | 2013033702 A1 | | 3/2013 |

OTHER PUBLICATIONS

"Office Action Issued in European Patent Application No. 13741633.5", dated Nov. 27, 2014, 7 Pages.
"Supplementary Search Report Issued in European Patent Application No. 13741633.5", dated Sep. 18, 2014, 3 Pages.
"Final Office Action Issued in U.S. Appl. No. 14/642,378", dated Oct. 19, 2015, 13 Pages.
"Non-Final Office Action Issued in U.S. Appl. No. 14/642,378", dated Jun. 12, 2015, 12 Pages.
"Non-Final Office Action Issued in U.S. Appl. No. 14/642,378", dated Mar. 2, 2016, 10 Pages.
"Notice of Allowance Issued in U.S. Appl. No. 14/642,378", dated Aug. 4, 2016, 7 Pages.
"Notice of Allowance Issued in U.S. Appl. No. 14/642,378", dated Sep. 26, 2016, 7 Pages.
"Notice of Allowance Issued in U.S. Appl. No. 14/642,378", dated Jan. 17, 2017, 7 Pages.
"Final Office Action Issued in U.S. Appl. No. 14/835,693", dated May 6, 2016, 16 Pages.
"Non-Final Office Action Issued in U.S. Appl. No. 14/835,693", dated Feb. 3, 2016, 14 Pages.
"Non-Final Office Action Issued in U.S. Appl. No. 14/835,693", dated Aug. 26, 2016, 15 Pages.
"Non-Final Office Action Issued in U.S. Appl. No. 14/839,243", dated Jun. 16, 2016, 16 Pages.
"First Office Action and Search Report Issued in Chinese Patent Application No. 201380006806.5", dated Dec. 1, 2015, 15 Pages.
"Notice of Allowance Issued in Chinese Patent Application No. 201380006806.5", dated Mar. 1, 2017, 4 Pages.
"Second Office Action Issued in Chinese Patent Application No. 201380006806.5", dated Aug. 12, 2016, 7 Pages.
"First Office Action and Search Report Issued in Chinese Patent Application No. 201380006974.4", dated Nov. 30, 2016, 16 Pages.
"Office Action Issued in Chinese Patent Application No. 201380057427.9", dated Jan. 3, 2016, 15 pages.
"Notice of Allowance Issued in Russian Patent Application No. 2014131055", dated Nov. 24, 2016, 16 Pages.
"Office Action Issued in Russian Patent Application No. 2014131055", dated Aug. 18, 2016, 5 Pages (w/o English Translation).
"Office Action Issued in Japanese Patent Application No. 2014-554756", dated Nov. 22, 2016, 5 Pages.
"Office Action Issued in Japanese Patent Application No. 2014-554805", dated Feb. 14, 2017, 9 Pages.
"Office Action Issued in Japanese Patent Application No. 2014-554805", dated Jul. 19, 2016, 12 Pages.
Balasubramanian, Aruna, "Architecting Protocols to Enable Mobile Applications in Diverse Wireless Networks", In a Dissertation Submitted to the Graduate School of the University of Massachusetts Amherst in Partial Fulfillment of the Requirements for the Degree of Doctor of Philosophy, Feb. 2011, 198 Pages.
Blass, Evan, "Exclusive: Windows Phone 8 Detailed", Retrieved from <<http://pocketnow.com/windows-phone/exclusive-windows-phone-8-detailed>>, Feb. 3, 2012, 2 Pages.
Heikkinen, et al., "Measuring Mobile Peer-to-Peer Usage: Case Finland 2007", In Proceedings of the 10th International Conference on Passive and Active Network Measurement, Apr. 28, 2009, pp. 165-174.
Heinz II, J. Gerard, et al., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.
"Notice of Allowance Issued in Mexican Patent Application No. MX/a/2014/008566", dated Sep. 23, 2016, 2 Pages.
"International Preliminary Report on Patentability Issued in PCT Application No. PCT/US13/022822", dated Aug. 7, 2014, 6 Pages.
"International Preliminary Report on Patentability Issued in PCT Application No. PCT/US2013/022353", dated Aug. 7, 2014, 7 Pages.
"International Search Report & Written Opinion Issued in PCT Application No. PCT/US2013/022353", dated May 15, 2013, 10 Pages.
"International Search Report & Written Opinion Issued in PCT Patent Application No. PCT/US2013/022822", dated Apr. 25, 2013, 9 Pages.
"International Preliminary Report on Patentability Issued in PCT Application No. PCT/US2013/056923", dated Mar. 19, 2015, 8 Pages.
"International Search Report & Written Opinion Issued in PCT Application No. PCT/US2013/056923", dated Jan. 7, 2014, 11 Pages.
Peddemors, Arjan, "Network Resource Awareness and Prediction on Mobile Devices", In Novay PhD Research Series, No. 026 (Novay/PRS/026), Oct. 20, 2009, 236 Pages.
Pluta, et al., "Who Moved My Data? A Backup Tracking System for Dynamic Workstation Environments", In Proceedings of LISA '04: Eighteenth Systems Administration Conference, Nov. 14, 2004, pp. 176-186.
Rhee, Ed, "How to Track Data Usage on your Android Phone", Retrieved from <<http://www.cnet.com/how-to/how-to-track-data-usage-on-your-android-phone/>>, Jul. 8, 2011, 4 Pages.
Sinofsky, Steven, "Engineering Windows 8 for Mobile Networks", Retrieved from <<https://blogs.msdn.microsoft.com/b8/2012/01/20/engineering-windows-8-for-mobile-networks/>>, Jan. 20, 2012, 28 Pages.
Unuth, Nadeem, "Data Usage Monitor Apps for Your iPhone and iPad", Retrieved from <<http://voip.about.com/od/voipbandwidth/tp/Data-Usage-Monitor-Apps-For-Your-Iphone-And-Ipad.htm>>, Retrieved Date: Oct. 8, 2012, 1 Page.
"—Analyze your 3G Data Usage on Your Computer", Retrieve from <<http://prmac.com/release-id-27794.htm>>, Jul. 9, 2011, 2 Pages.
"Mobile Data Usage Meter—Manage Mobile Data Usage & Wireless Broadband Devices", Retrieved from <<http://web.archive.org/web/20091228092436/http://www.telstrabusiness.com/business/portal/online/site/myaccount/mobiledatausagemeter.94003>>, Jan. 28, 2015, 2 Pages.
"My Data Usage Pro", Retrieve from <<http://download.cnet.com/My-Data-Usage-Pro/3000-2094_4-75402502.html>>, Retrievd Date: Dec. 12, 2014, 3 Pages.
"Rapid Mobile Data Service Creation and Monetization", Retrieved from <<http://qpass.net/Products/network-control/Documents/data-experience-solution-datasheet.pdf>>, Oct. 2, 2012, 7 Pages.
"Office Action and Search Report Issued in Taiwan Patent Application No. 102101668", dated Dec. 14, 2016, 10 Pages.
"Final Office Action Issued in U.S. Appl. No. 13/721,023", dated Oct. 27, 2014, 16 Pages.

(56) References Cited

OTHER PUBLICATIONS

"Final Office Action Issued in U.S. Appl. No. 13/721,023", dated Oct. 5, 2015, 26 Pages.
"Non-Final Office Action Issued in U.S. Appl. No. 13/721,023", dated Mar. 28, 2014, 16 Pages.
"Non-Final Office Action Issued in U.S. Appl. No. 13/721,023", dated Feb. 13, 2015, 19 Pages.
"Non-Final Office Action Issued in U.S. Appl. No. 13/721,023", dated Jun. 16, 2016, 23 Pages.
"Final Office Action Issued in U.S. Appl. No. 13/721,029", dated Oct. 1, 2014, 19 Pages.
"Non-Final Office Action Issued in U.S. Appl. No. 13/721,029", dated Mar. 17, 2015, 25 Pages.
"Non-Final Office Action Issued in U.S. Appl. No. 13/721,029", dated Feb. 18, 2016, 33 Pages.
"Non-Final Office Action Issued in U.S. Appl. No. 13/721,029", dated Mar. 11, 2014, 14 Pages.
"Notice of Allowance Issued in U.S. Appl. No. 13/721,029", dated Aug. 30, 2016, 9 Pages.
"Non-Final Office Action for U.S. Appl. No. 13/721,032", dated Aug. 5, 2014, 16 Pages.
"Non-Final Office Action for U.S. Appl. No. 13/721,032", dated Feb. 6, 2014, 11 Pages.
"Notice of Allowance Issued in U.S. Appl. No. 13/721,032", dated Jan. 30, 2015, 13 Pages.
"Final Office Action Issued in U.S. Appl. No. 13/721,041", dated Sep. 14, 2015, 24 Pages.
"Non-Final Office Action Issued in U.S. Appl. No. 13/721,041", dated Mar. 28, 2014, 15 Pages.
"Non-Final Office Action Issued in U.S. Appl. No. 13/721,041", dated Apr. 8, 2016, 24 Pages.
"Non-Final Office Action Issued in U.S. Appl. No. 13/721,041", dated Jan. 7, 2015, 20 Pages.
"Applicant Initialed Interview Summary Issued in U.S. Appl. No. 13/721,053", dated May 30, 2014, 3 Pages.
"Examiner Initialed Interview Summary Issued in U.S. Appl. No. 13/721,053", dated Aug. 19, 2014, 2 Pages.
"Non-Final Office Action Issued in U.S. Appl. No. 13/721,053", dated Mar. 18, 2014, 8 Pages.
"Notice of Allowance Issued in U.S. Appl. No. 13/721,053", dated Oct. 28, 2014, 7 Pages.
"Notice of Allowance Issued in U.S. Appl. No. 13/721,053", dated Aug. 19, 2014, 14 Pages.
"Final Office Action Issued in U.S. Appl. No. 13/721,057", dated Sep. 30, 2015, 36 Pages.
"Final Office Action Issued in U.S. Appl. No. 13/721,057", dated Jul. 15, 2016, 31 Pages.
"Non-Final Office Action Issued in U.S. Appl. No. 13/721,057", dated Feb. 25, 2016, 28 Pages.
"Non-Final Office Action Issued in U.S. Appl. No. 13/721,057", dated Mar. 27, 2015, 30 Pages.
"Final Office Action Issued in U.S. Appl. No. 13/721,058", dated Sep. 22, 2014, 15 Pages.
"Non-Final Office Action Issued in U.S. Appl. No. 13/721,058", dated Apr. 16, 2014, 11 Pages.
"Non-Final Office Action Issued in U.S. Appl. No. 13/721,058", dated Jan. 22, 2015, 13 Pages.
"Notice of Allowance Issued in U.S. Appl. No. 13/721,058", dated May 8, 2015, 7 Pages.
"Notice of Allowance Issued in U.S. Appl. No. 13/721,058", dated Sep. 14, 2015, 3 Pages.
"Final Office Action Issued in U.S. Appl. No. 13/721,066", dated Oct. 15, 2015, 20 Pages.
"Non-Final Office Action Issued in U.S. Appl. No. 13/721,066", dated Mar. 23, 2016, 27 Pages.
"Non-Final Office Action Issued in U.S. Appl. No. 13/721,066", dated Feb. 13, 2015, 17 Pages.
"Final Office Action Issued in U.S. Appl. No. 13/721,069", dated Nov. 28, 2014, 23 Pages.
"Non-Final Office Action Issued in U.S. Appl. No. 13/721,069", dated Jul. 7, 2015, 27 Pages.
"Non-Final Office Action Issued in U.S. Appl. No. 13/721,069", dated Mar. 14, 2014, 15 Pages.
"Notice of Allowance Issued in U.S. Appl. No. 13/721,069", dated Feb. 17, 2016, 12 Pages.
"Non-Final Office Action Issued in U.S. Appl. No. 13/721,083", dated Jun. 5, 2015, 10 Pages.
"Notice of Allowance Issued in U.S. Appl. No. 13/721,083", dated Oct. 5, 2015, 8 Pages.
"Non Final Office Action Issued in U.S. Appl. No. 13/721,083", dated Jun. 5, 2015, 10 Pages.
"Office Action Issued in European Patent Application No. 13741434.8", dated Oct. 26, 2015, 13 Pages.
"Office Action Issued in European Patent Application No. 13741434.8", dated Jul. 19, 2016, 15 Pages.
"Office Action Issued in European Patent Application No. 13741434.8", dated Nov. 27, 2014, 6 Pages.
"Supplementary Search Report Issued in European Patent Application No. 13741434.8", dated Sep. 30, 2014, 3 Pages.

\* cited by examiner

DATA USAGE PROFILES FOR USERS AND APPLICATIONS

CROSS-REFERENCE TO RELATED APPLICATIONS

This application is a continuation and claims the benefit of U.S. application Ser. No. 13/721,029, which itself claims priority to: U.S. Provisional Application No. 61/696,472, filed Sep. 4, 2012; U.S. Provisional Application No. 61/591,503, filed Jan. 27, 2012; and U.S. Provisional Application No. 61/591,509, filed Jan. 27, 2012. These four provisional and non-provisional applications are hereby incorporated by reference herein for all intents and purposes.

This application is related to the following applications: U.S. application Ser. No. 14/642,378 entitled "Tracking Data Usage Under a Schematized Data Usage Plan," U.S. application Ser. No. 13/721,066 entitled "Managing Data Transfers Over Network Connections Based on Priority and a Data Usage Plan," U.S. application Ser. No. 13/721,083 "On-Device Attribution of Network Data Usage," U.S. application Ser. No. 13/721,041 entitled "Predicting Network Data Consumption Relative to Data Usage Patterns," U.S. application Ser. No. 13/721,069 entitled "Updating Dynamic Data Usage Plans and Statistics," U.S. application Ser. No. 13/721,023 entitled "Recommendations for Reducing Data Consumption Based on Data Usage Profiles," U.S. patent application Ser. No. 13/721,032 entitled "Dynamically Adjusting a Data Usage Plan Based on Data Usage Statistics," and U.S. application Ser. No. 13/721,058 entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage network data consumption per user and per application in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can adversely impact the user experience, leading to dissatisfied customers, increased customer service calls, and negative impressions of the mobile operators.

SUMMARY

Embodiments of the disclosure profile users and/or applications in view of data usage. For example, data usage statistics are received for a plurality of users. The data usage statistics represent data usage by the plurality of users under a data usage plan. The received data usage statistics for the plurality of users are compared with data usage statistics associated with a plurality of user data usage profiles. Each of the plurality of users is assigned to one of the plurality of user data usage profiles based on the comparison.

As another example, data usage statistics associated with the plurality of applications are calculated. The data usage statistics represent data usage by the plurality of applications under a data usage plan. The calculated data usage statistics are analyzed to rank the plurality of applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure profile users 104 and applications 114 in terms of data usage. In some embodiments, the users 104 and applications 114 are compared and contrasted with each other based on the amount of network data consumed and other data usage statistics 120. Profiles matching the network data consumption are assigned to the users 104 and to the applications 114. The applications 114 may be ranked or rated based on data usage, and then promoted or demoted in an application marketplace based on the rankings.

Aspects of the disclosure further analyze the data usage statistics 120 to match users 104 to mobile operators 111 and data plans appropriate for the users 104 based on the data usage. For example, a recommendation may be made to the user 104 to switch mobile operators 111 and/or data usage plans 116 to reduce charges incurred during a billing period.

Figure 1:
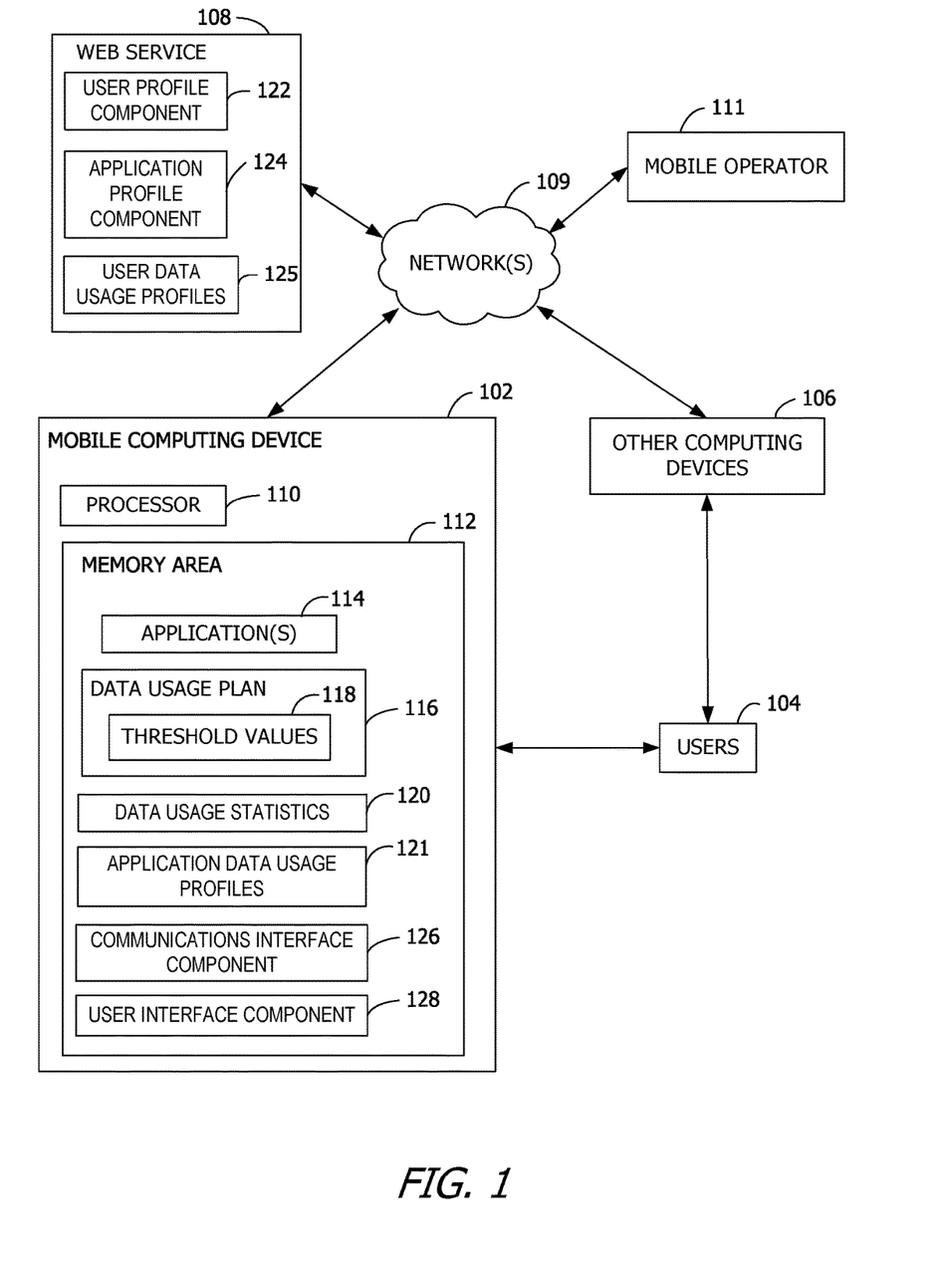
FIG. 1 is an exemplary block diagram illustrating a web service interacting with a mobile operator and user computing devices.

Referring to FIG. 1, an exemplary block diagram illustrates a web service 108 interacting with the mobile operators 111 and user computing devices. The user computing devices include, for example, a mobile computing device 102 and other computing devices 106. The user computing devices communicate over one or more networks 109. One or more of the user computing devices are associated with at least one of the data usage plans 116. In some embodiments, a plurality of the user computing devices may share network data consumption allotted under the same or common data usage plan 116. For example, the mobile computing device 102 may represent a mobile telephone of the user 104, while the other computing devices 106 sharing the same data usage plan 116 may include a tablet and a laptop associated with the user 104. In other embodiments, each of the mobile computing device 102 and the other user computing devices has a separate data usage plan 116.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone (e.g., mobile telephone 404 in FIG. 4), laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108. The web service 108 may further store, or have access to, a computer-executable user profile component 122 and a computer-executable application profile component 124. Operation of the user profile component 122 and the application profile component 124, when executed, is described below with reference to FIG. 3.

As shown in FIG. 1, the web service 108 also stores one or more user data usage profiles 125. Each of the user data usage profiles 125 correspond to particular data usage statistics 120 or other data use characteristics such as total consumption, consumption during particular intervals, etc. The user data usage profiles 125 reflect network data usage by the plurality of applications 114 executing on the mobile computing device 102. As such, the user data usage profiles 125 represent an aggregation and/or compilation of the data usage statistics 120 associated with each of the executing applications 114.

Alternatively or in addition, the mobile computing device 102 and/or other user computing devices may store one or more of the user data usage profiles 125.

In some embodiments, the mobile computing device 102 has at least one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures (e.g., FIG. 2).

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections representing communication channels or other means for sending and/or receiving data over the network 109. Exemplary network connections include, but are not limited to, Wi-Fi, cellular, tethered, BLUETOOTH brand communication, near-field communication (NFC), and more. The network connections may also be categorized into voice, text, data, or other categories or types of network traffic.

The memory area 112 further stores at least one data usage plan 116. The data usage plan 116 describes the services provided by the mobile operator 111, such as the amount of network data the user 104 can consume during a particular duration (e.g., a billing time period). For example, the user 104 has contracted with the mobile operator 111 to receive such network data transfer services from the mobile operator 111. In the example of FIG. 1, the data usage plan 116 describes threshold values 118 associated with the network connections of one or more devices of the user 104. The threshold values 118 represent a maximum amount of network data consumption allotted under the data usage plan 116 for the network connections. For example, one threshold value 118 may indicate a maximum amount of network data consumption for a Wi-Fi connection, while another threshold value 118 indicates a maximum amount of network data consumption for a cellular data connection.

The memory area 112 may also store data usage statistics 120 collected, generated, or received by the mobile computing device 102 and/or the mobile operators 111. The data usage statistics 120 represent data usage by the plurality of applications 114 under at least one of the data usage plans 116 available to the mobile computing device 102. Data usage statistics 120 are described further with reference to FIG. 2 below.

The memory area 112 may also store one or more application data usage profiles 121. Each of the application data usage profiles 121 correspond to particular data usage statistics 120 or other data use characteristics such as total consumption, consumption during particular intervals, etc.

associated with one or more of the applications 114. In some embodiments, the application data usage profiles 121 associated with the particular applications 114 executing on the mobile computing device 102 of the user 104 are merged, aggregated, compiled, or otherwise combined to produce the user data usage profile 125 for the user 104.

In some embodiments, the web service 108 may store one or more of the application data usage profiles 121 stored by the mobile computing device 102. In some embodiments, the memory area 112 may also store one or more of the user data usage profiles 125. For example, the web service 108 may push copies of defined sets of the application data usage profiles 121 and/or the user data usage profiles 125 to the mobile computing device 102. As another example, the web service 108 may store both the application data usage profiles 121 and the user data usage profiles 125, while the mobile computing device 102 stores a subset of the profiles 121, 125 stored by the web service 108.

The memory area 112 further stores exemplary computer-executable components such as a communications interface component 126 and a user interface component 128. In some embodiments, the communications interface component 126 includes a network interface card and/or computer-executable instructions (e.g., a driver) for operating the network interface card. In some embodiments, the communications interface is operable with near-field communication (NFC) tags.

The user interface component 128 may include a graphics card for displaying data to the user 104 and receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device in a particular way.

Figure 2:
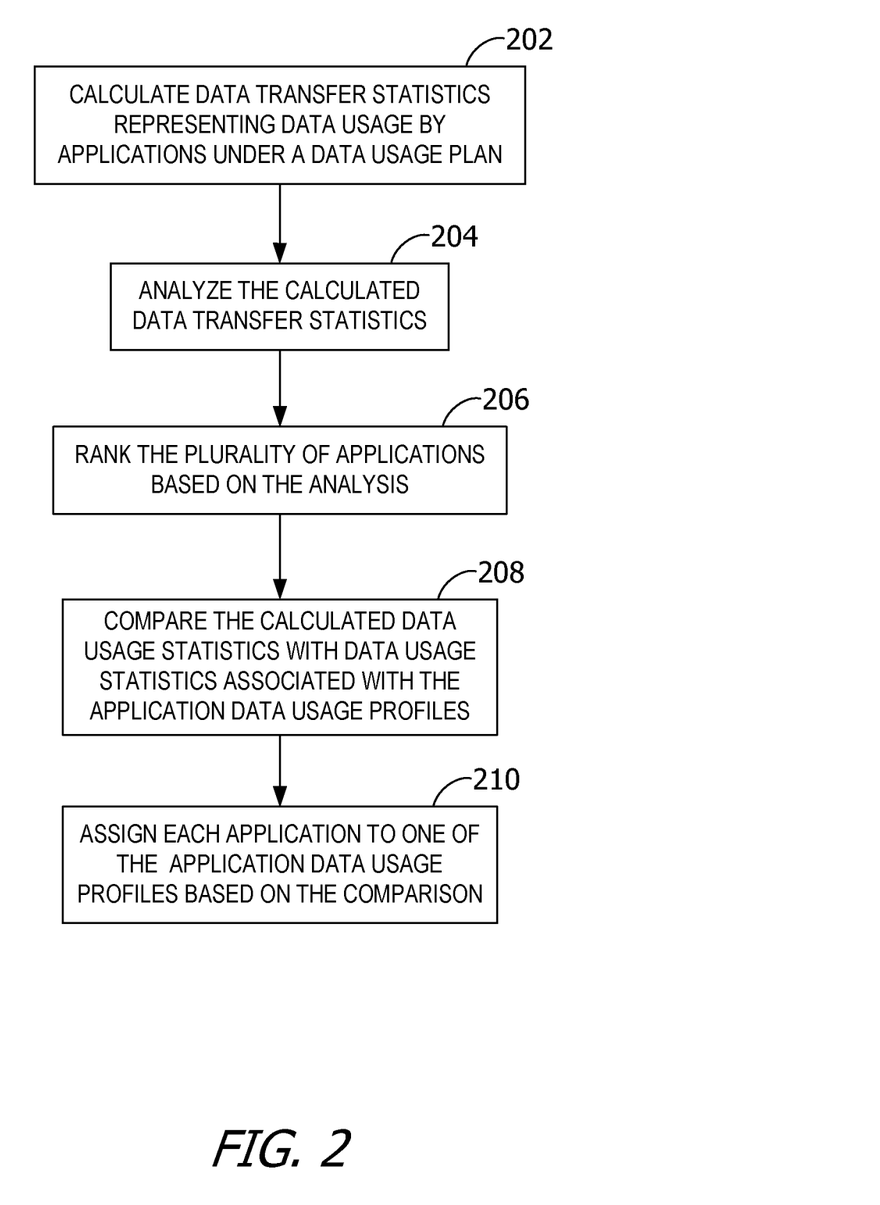
FIG. 2 is an exemplary flow chart illustrating operation of a user computing device to profile applications based on network data consumption.

Referring next to FIG. 2, an exemplary flow chart illustrates operation of the user computing device to profile applications 114 based on network data consumption. While the operations illustrated in FIG. 2 are performed by the mobile computing device 102 or other user computing device in some embodiments (e.g., by an operating system executing thereon), one or more of the operations may be performed by other devices, including any computing device local to, or remote from, the user 104. For example, the operations may be performed by a proxy device in communication with the web service 108.

At 202, the mobile computing device 102 calculates the data usage statistics 120 associated with the plurality of applications 114 stored in the memory area 112 of the mobile computing device 102. The calculated data usage statistics 120 represent data usage by one or more of the plurality of applications 114 under the data usage plan 116 available to the mobile computing device 102. The data usage statistics 120 may be viewed as a current or instant snapshot of the amount of data transmitted and/or received by the mobile computing device 102, and possibly by one or more of the other user computing devices that share the data usage plan 116. For example, the data usage statistics 120 identify the amount of data transmitted and/or received to a granularity of time (e.g., per minute) or data (e.g., per kilobyte), as well as the application 114 requesting the network data consumption and the network connections used for the transfer. The data usage statistics 120 may describe the plurality of applications 114, one of the applications 114, or a portion of one of the applications 114. In this manner, the applications 114, or portions thereof, may be compared and contrasted with each other.

In some embodiments, a background transfer service (e.g., a download manager) executing on the mobile computing device 102 queues requests to download/upload data. Existing systems do not show or track which applications 114 make each request. In contrast, with aspects of the disclosure, the mobile computing device 102 disambiguates or attributes the request to the requesting application 114 for tracking purposes. For example, each application 114 registers at least one identifier with the operating system, application 114, or web service 108 that collects the data usage statistics 120. Applications 114 may register additional identifiers to increase the granularity of resource tracking (e.g., a mail program may track data transfers for each mail account).

Additional and/or other data usage statistics 120 are contemplated. For example, the data usage statistics 120 may identify the amount of data consumed, the time and date of usage, the location of usage, network interface used, the SIM card or other user identity module used for dual SIM scenarios, the international mobile station equipment identity (IMEI) or other device identifier for multi-device scenarios, the IP or other address of the access point used for Wi-Fi scenarios, the IP or other address of the target computer (e.g., for whitelist/blacklists in data usage), and the application responsible for the data transfer. The data usage statistics 120 may relate to text messages, data, voice calls, minutes used, voice over Internet Protocol (VoIP) usage, and any other element of usage consumed by, or that impacts, the mobile computing device 102.

In some examples, the mobile computing device 102 tracks or monitors network data consumption by the mobile computing device 102 by compiling the data usage statistics 120 directly (e.g., monitoring network traffic). For example, the mobile computing device 102 collects ongoing usage data relating to network data transfers, such as from device radios, drivers, and accelerometers. In other embodiments, the mobile computing device 102 calculates the data usage statistics 120 by collecting or receiving the data usage statistics 120 from the web service 108 and/or the mobile operator 111.

The data usage statistics 120 may further represent network data consumed under the data usage plan 116 by each of the user computing devices sharing the data usage plan 116, not just the mobile computing device 102 alone. In such embodiments, the mobile computing device 102 may receive updates of network data consumption by the other user computing devices sharing the same data usage plan 116. The updates may be received from the other user computing devices directly, or from an aggregator such as the web service 108. For example, the data usage statistics 120 may represent the network data collectively consumed by a mobile telephone, tablet, and laptop of the user 104 that share the same data usage plan 116.

In examples in which a plurality of data usage plans 116 are available to the mobile computing device 102, the mobile computing device 102 (or the web service 108) collects the data usage statistics 120 corresponding to each of the data usage plans 116. In such an example, there may a plurality of sets of data usage statistics 120 (e.g., one set for each data usage plan 116).

At 204, the mobile computing device 102 analyzes the calculated data usage statistics 120. Analyzing the calculated data usage statistics 120 includes, for example, profiling the applications 114 or otherwise analyzing usage patterns among the applications 114 to enable comparison of the applications 114 based on data consumption. The patterns relate to the way the user 104 uses the services of the mobile operator(s) via the mobile computing device 102. For example, the mobile computing device 102 may analyze the data usage statistics 120, aggregated from a plurality of the applications 114, to:

- identify those applications 114 that consume the most network data or the least network data
- identify when network data is consumed the most or least (e.g., what time of day)
- identify where network data is consumed most or least (e.g., the physical location of the mobile computing device 102)
- determine the amount of data sent or received over each network connection
- determine the amount of data sent while roaming and not roaming
- determine how frequently the user 104 uses each network connection.

In embodiments in which the mobile computing device 102 aggregates data usage statistics 120 from a plurality of the user computing devices (or when the operations illustrated in FIG. 2 are performed by the web service 108), information describing the mobile operators 111 and data usage plans 116 may be derived. For example, the mobile computing device 102 may determine which mobile operators 111 and data usage plans 116 are being used by the user computing devices. The mobile computing device 102 may also analyze the types of data usage plans 116, including the threshold limits associated with the data usage plans 116.

At 206, the mobile computing device 102 ranks the plurality of applications 114 based on the analysis. For example, the mobile computing device 102 orders the plurality of applications 114 from lowest data usage to highest data usage, or vice versa, and displays the ordered plurality of applications 114 to the user 104 in some embodiments.

In embodiments involving the application data usage profiles 121 such as shown in FIG. 1, the mobile computing device 102 compares at 208 the calculated data usage statistics 120 associated with each of the applications 114 with data usage statistics 120 associated with the application data usage profiles 121. Comparing includes, for example, matching or correlating the calculated data usage statistics 120 associated with each of the applications 114 with the data usage statistics 120 associated with the application data usage profiles 121 to identify one of the application data usage profiles 121 corresponding to each of the applications 114. The identified application data usage profile 121 for each of the applications 114 describes the data usage of that application 114. In this manner, the mobile computing device 102 assigns at 210 each of the plurality of applications 114 to one of the plurality of application data usage profiles 121 based on the comparison of the data usage statistics 120.

The mobile computing device 102 may further rate each of the applications 114 in terms of data usage (e.g., based on the assigned application data usage profile 121). For example, if Application A is assigned to a "high network data consumption" application data usage profile 121 while Application B is assigned to a "moderate network data consumption" application data usage profile 121, the mobile computing device 102 may rank Application A higher than Application B in terms of network data consumption.

The assigned application data usage profiles 121 and/or rankings may be provided to an application marketplace. The application marketplace represents a portal (e.g., web page) where users 104 are able to download one or more of the applications 114. For example, the web service 108 operating or administering the application marketplace may crowdsource the assignments by the user computing devices of the application data usage profiles 121 to the applications 114. For example, a service executing on each of the mobile computing devices 102, or executing on the web service 108, periodically obtains the assignments from the mobile computing devices 102 and updates a central service (e.g., the web service 108) with this information. This enables the web service 108 to provide users 104 of the application marketplace with an understanding of the data usage of each application 114 as observed by a plurality of the user computing devices. In other embodiments, the actual raw usage information about each application 114 is aggregated across numerous users 104. The aggregated information is then used to assign application data usage profiles 121 to the applications 114.

Figure 3:
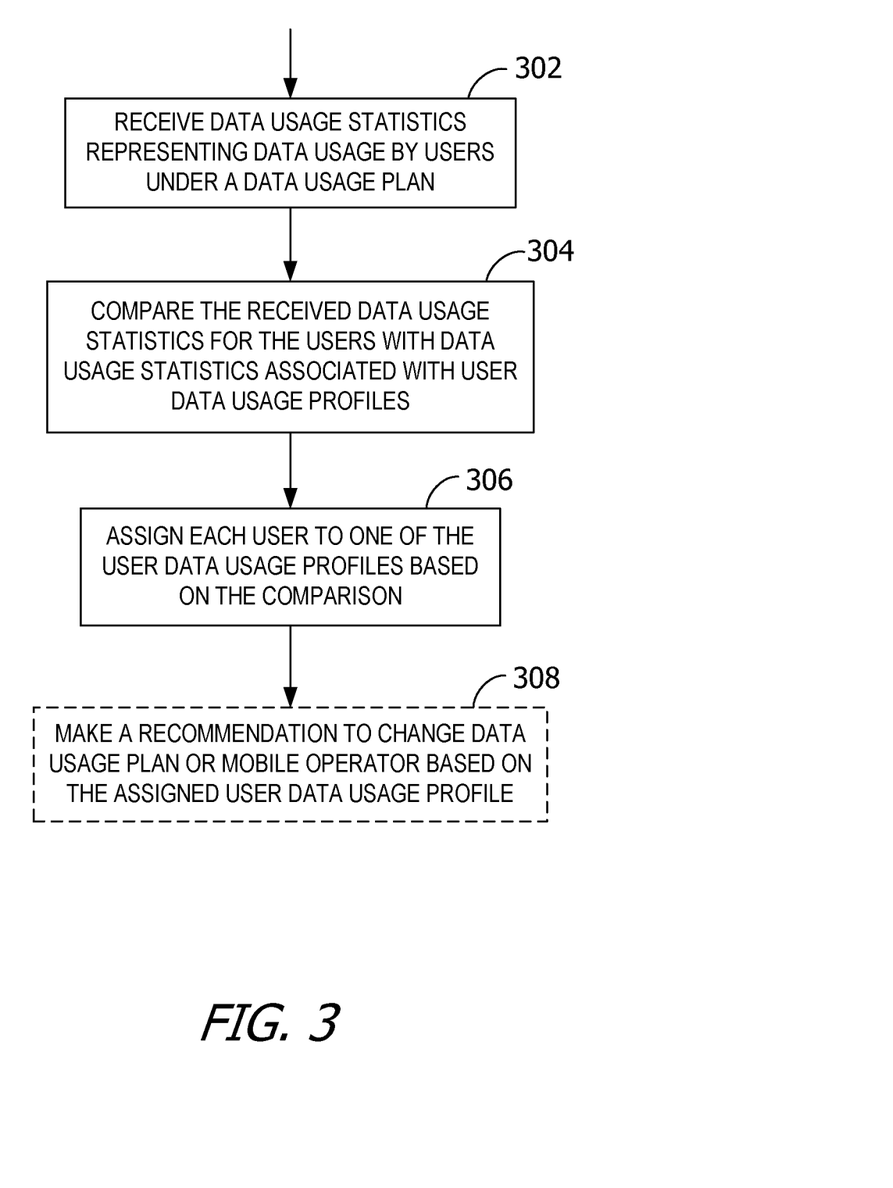
FIG. 3 is an exemplary flow chart illustrating operation of a web service to profile users based on network data consumption.

Referring next to FIG. 3, an exemplary flow chart illustrates operation of the web service 108 to profile users 104 based on network data consumption. While the operations illustrated in FIG. 3 are performed by the web service 108 in some embodiments, one or more of the operations may be performed by other devices, including any computing device local to, or remote from, the user 104. For example, the operations may be performed by a proxy device in communication with the web service 108. As another example, the operations may be performed by an operating system or application program executing on the mobile computing device 102 or other user computing device.

At 302, the web service 108 receives the data usage statistics 120 relating to one or more of the users 104. For example, the web service 108 may receive the data usage statistics 120 from the mobile operator(s), from the user computing devices of the users 104, or both. In another example, the web service 108 may receive the data usage statistics 120 by monitoring network traffic to/from the user computing devices.

At 304, the web service 108 compares the received data usage statistics 120 for the users 104 with data usage statistics 120 associated with a plurality of the user data usage profiles 125. For example, the web service 108 receives, creates, defines, maintains, or otherwise has access to at least one of the user data usage profiles 125. Each of the user data usage profiles 125 has user data usage statistics 120 associated therewith. For example, User Data Usage Profile A may have data usage statistics 120 associated therewith that indicate large network data consumption over time, while User Data Usage Profile B may have data usage statistics 120 associated therewith that indicate low network data consumption over time.

The web service 108 compares the data usage statistics 120 of the user 104 with the data usage statistics 120 of each of the data usage profiles to match the data usage statistics 120 of the user 104 to the data usage statistics 120 associated with one of the plurality of user data usage profiles 125. The comparison may further include, for example, identifying similarities in usage patterns such as the amount of network data consumed during a particular time interval, variations in network data consumption over time, and the like. Continuing the above example, if the user 104 regularly streams online videos, the web service 108 may match the user 104 to User Data Usage Profile A because the data usage statistics 120 of the user 104 more closely match the data usage statistics 120 of User Data Usage Profile A than User Data Usage Profile B.

At 306, the web service 108 assigns the user 104 to one of the plurality of user data usage profiles 125 based on the comparison performed at 304. Continuing the above example, the user 104 is assigned to User Data Usage Profile A.

In some embodiments, the web service 108 creates or defines one or more of the user data usage profiles 125. For example, the web service 108 may arrange a plurality of the users 104 into groups based on the data usage statistics 120 of the plurality of users 104. In this manner, the web service 108 is able to differentiate among the plurality of users 104 based on the data usage statistics 120. The web service 108 then creates or defines one of the user data usage profiles 125 for each of the groups (e.g., links the user data usage profile 125 to the data use characteristics of that group), and matches the plurality of users 104 to the created user data usage profiles 125 corresponding based on the group to which the users 104 belong. The arrangement of the users 104 into groups may be dynamic such that, over time, the users 104 may move from one group to another as additional data is collected. As such, the user data usage profiles 125 evolve over time.

Alternatively or in addition to assigning each of the users 104 to one of the user data usage profiles 125, the web service 108 may match each user 104 to one of a plurality of mobile operators 111 and/or data usage plans 116 based on the assigned user data usage profile 125. For example, the web service 108 may match the users 104 of a particular group to the same mobile operator 111 and/or data usage plan 116 (e.g., the users 104 in the group each being assigned to the same mobile operator 111 and/or data usage plan 116). In this manner, the web service 108 groups or connects each of the users 104 to one of the mobile operators 111 and/or data usage plans 116 based on the usage patterns or other data usage statistics 120 of the users 104.

The web service 108 may further determine whether a current data usage plan 116 for at least one of the users 104 is appropriate for that user 104, based on the current data usage statistics 120 of the user 104 relative to the data usage statistics 120 of the user data usage profile 125 to which the user 104 has been assigned (e.g., in case the data usage by the user 104 has changed since the previous assignment). For example, the web service 108 may compare the data usage statistics 120 of the assigned user data usage profile 125 for the user 104 to a current data usage plan 116 of the user 104, and then make recommendations based thereon at 308. If the user 104 is consuming significantly more or less network data (e.g., by a threshold amount or percentage) than the current data usage plan 116 allows, the web service 108 may recommend that the user 104 switch from the current data usage plan 116 to the data usage plan 116 associated with the user data usage profile 125 to which the user 104 has been assigned. In this manner, the web service 108 is able to identify possible cost savings to the user 104 based on the assigned user data usage profile 125.

In some embodiments, the web service 108 may store, or have access to, one or more computer-executable components for implementing one or more of the operations illustrated in FIG. 3. For example, the user profile component 122, when executed, causes a processor to receive data usage statistics 120 for a plurality of the users 104, compare the received data usage statistics 120 for the plurality of users 104 with data usage statistics 120 associated with a plurality of the user data usage profiles 125, and assign each of the plurality of users 104 to one of the plurality of the user data usage profiles 125 based on the comparison. The user profile component 122 may also assign a recommended data usage plan 116 and/or mobile operator 111 to each of the user data usage profiles 125.

The user profile component 122 may further obtain, receive, or otherwise access information describing at least one data usage plan 116 competing with a current data usage plan 116 of at least one of the users 104. The user profile component 122 presents the obtained information to the user 104 for review and selection to help the user 104 prevent or reduce the amount paid to transfer data over the networks 109.

The application profile component 124, when executed, causes a processor to receive the data usage statistics 120 associated with a plurality of the applications 114, analyze the received data usage statistics 120, rank the plurality of applications 114 based on the analysis, and present the ranked plurality of applications 114 in an application marketplace. As described above, the users 104 are able to download one or more of the applications 114 from the application marketplace.

The application profile component 124 may further present, to the users 104 in an application marketplace, the plurality of applications 114 as ranked. (e.g., see FIG. 5). In some embodiments, the application profile component 124 visually distinguishes a subset of the ranked applications 114 in the application marketplace as recommended applications 114, or applications 114 that consume less network data relative to their peers. For example, if Media Player A consumes less network data over time than Media Player B based on an analysis of the data usage statistics 120 of each, the application profile component 124 flags, highlights, promotes, or otherwise identifies Media Player A as a recommended application 114.

Figure 4:
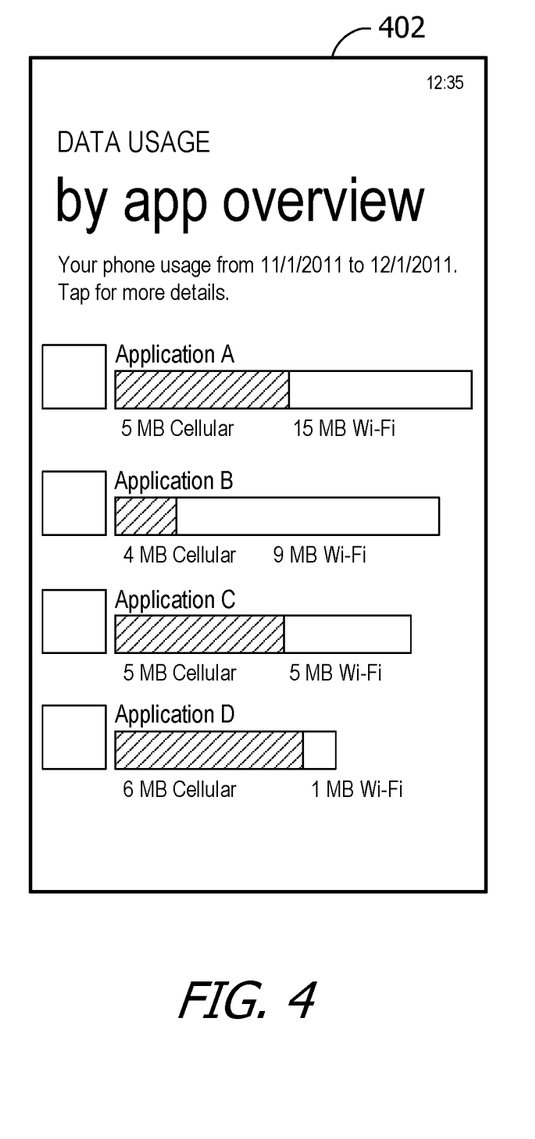
FIG. 4 is an exemplary user interface illustrating an overview of data usage per application.

Referring next to FIG. 4, an exemplary user interface 402 of the mobile computing device 102 illustrates an overview of data usage per application 114. In the example of FIG. 4, the user interface 402 displays network data consumption over cellular and Wi-Fi networks for each of four applications 114 executing on the mobile computing device 102: Application A has consumed 5 megabytes (MB) of cellular data and 15 MB of Wi-Fi data, Application B has consumed 4 MB of cellular data and 9 MB of Wi-Fi data, Application C has consumed 5 MB of cellular data and 5 MB of Wi-Fi data, and Application D has consumed 6 MB of cellular data and 1 MB of Wi-Fi data. While the user interface 402 in FIG. 4 illustrates only cellular and Wi-Fi data consumption, the network data used over other networks 109 may be displayed alternatively or in addition.

In some embodiments (not shown), the user interface 402 may show consumption of resources other than network data, such as power and/or memory consumption by each of the applications 114.

Figure 5:
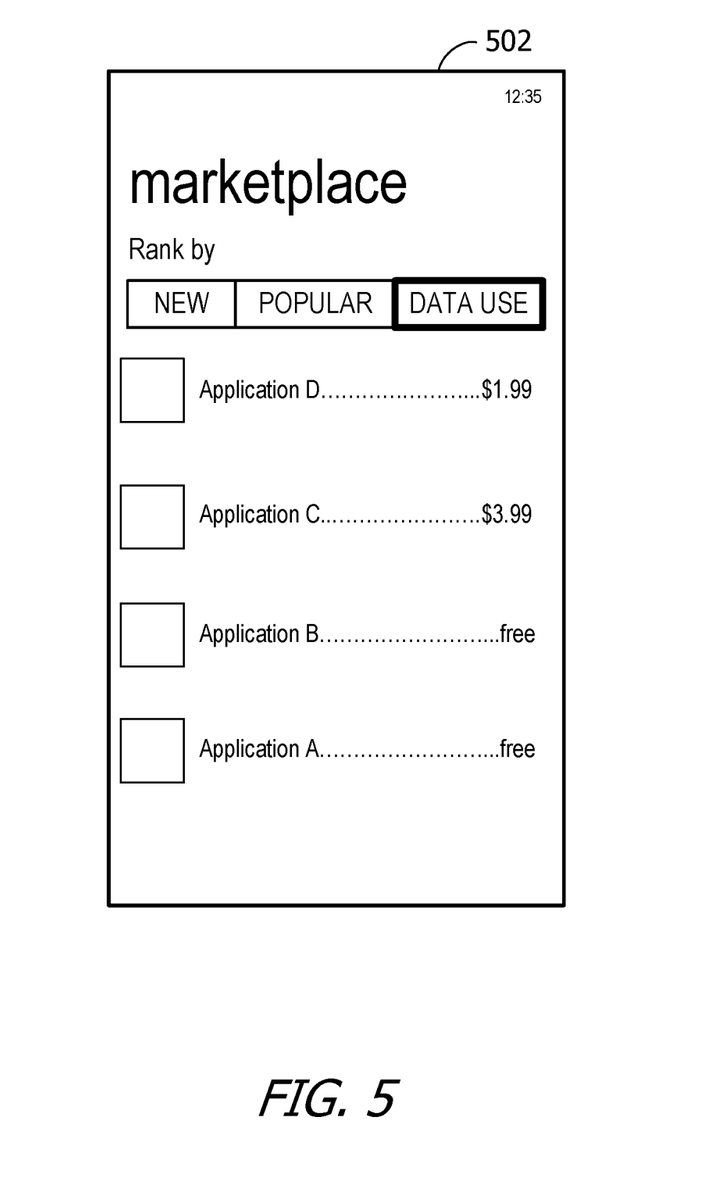
FIG. 5 is an exemplary user interface illustrating an application marketplace with applications available for download ranked by network data consumption.

Referring next to FIG. 5, an exemplary user interface 502 illustrates the application marketplace with applications 114 available for download ranked by network data consumption. In the example of FIG. 5, the user 104 is presented with three options for ranking the applications 114: New, Popular, and Data Use. The user 104 has selected Data Use, and the applications 114 are ranked in order of increasing network data consumption. If the network data consumption for each of the applications 114 mirrors that shown in the example of FIG. 4, the applications 114 are ranked as follows: Application D (consuming the least amount of network data), Application C, Application B, and Application A (consuming the highest amount of network data).

The application marketplace thus provides the user 104 not only with the financial cost for each application 114, but also the anticipated network data consumption of each application 114 relative to each other, based on empirical data. As such, while Applications A and B are free to the user to download and install in the example of FIG. 5, these applications 114 may display served or delivered advertisements to the user 104 that consume significant amounts of network data. As such, by viewing the Data Use tab in the application marketplace, the user 104 may realize that these applications 114 may end up costing more in terms of extra network data consumption than the download/install charges for Applications C or D, if the data usage plan 116 of the user 104 applies charges for network data consumption over a particular limit.

In some embodiments (not shown), the web service 108 may identify those applications 114 that are anticipated to incur excess network data consumption charges in view of the data usage plan 116 of the user 104 and/or current network data consumption by the user 104. For example, the web service 108 may determine that the expected increase in network data consumption if the user 104 installs Application A will push the user 104 over the threshold limits for the data usage plan 116, and incur excess network data consumption charges. In this example, the web service 108 may gray out, hide, or otherwise reduce the prominence of Application A. In contrast, the web service 108 may promote or otherwise increase the prominence of the applications 114 not expected to push to the user 104 over the threshold limits.

Further, the web service 108 may show the user 104 the average or expected network usage or traffic generated by each of the applications 114 as a percentage of the data usage plan 116 of the user 104. In this manner, the user 104 is able to see the effect and significance, specific to the user 104, on network data consumption from installing each of the applications 114 before installing the applications 114. In some embodiments, the mobile operators 111 may prorate or otherwise reduce the cost of network transfers by particular applications 114. In such embodiments, the web service 108 is aware of the prorating (e.g., as described in the data usage plan 116) and adjusts the percentages of the data usage plan 116 accordingly.

In still other embodiments (not shown), the web service 108 may identify and/or rank the applications 114 based on the type of network data consumed by the applications 114. If the network data consumption for each of the applications 114 mirrors that shown in the example of FIG. 4, the marketplace presents the applications 114 that mostly consume Wi-Fi data (e.g., Applications A and B) higher or more prominently than the applications 114 that consume cellular data (e.g., Applications C and D), if the cost for Wi-Fi data is less than the cost for cellular data in the data usage plan 116 of the user 104.

Figure 6:
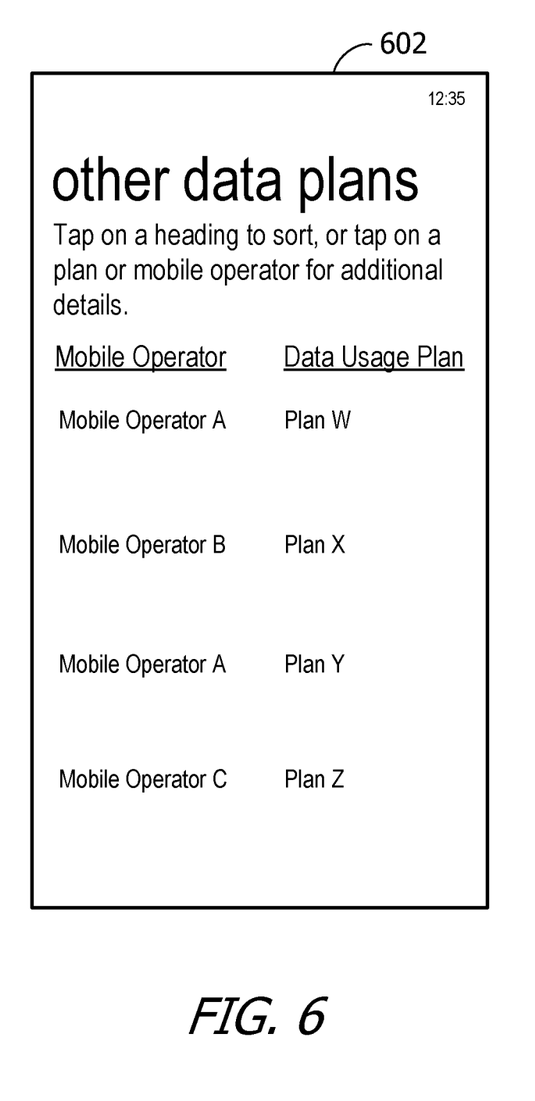
FIG. 6 is an exemplary user interface illustrating recommendations for alternative data usage plans to reduce network transfer costs for the user.

Referring next to FIG. 6, an exemplary user interface 602 illustrates recommendations for alternative data usage plans 116 to reduce network transfer costs for the user 104. In the example of FIG. 6, the user interface 602 identifies the name of the mobile operator 111 for each data usage plan 116. However, other data may be provided to the user 104, such as the cost of each data usage plan 116 (e.g., monthly charge) and/or the expected financial cost savings (e.g., in dollars) for each data usage plan 116 if the user 104 switches to that data usage plan 116.

In FIG. 6, the user interface 602 displays the data usage plans 116 in decreasing order of anticipated cost savings. For example, Mobile Operator A/Plan W is listed first, followed by Mobile Operator B/Plan X, Mobile Operator A/Plan Y, and Mobile Operator C/Plan Z.

ADDITIONAL EXAMPLES

As a further example, a developer may produce a low data usage version or mode of an application. The developer promotes this version of the application as a "data sipper" application in a description of the application in an online application marketplace to increase the amount of downloads for that application.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for profiling the plurality of applications 114 based at least on the calculated data usage statistics 120.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area associated with a mobile computing device, said memory area storing a plurality of applications; and
   a processor programmed to:
   receive network consumption data for applications on a mobile device of a user,
   access other network consumption data for a plurality of other applications on devices of a plurality of other users;
   identify a user profile for the plurality of other users based on the other network consumption data for the plurality of other applications;
   classify the user with the user profile based on the received network consumption data for the applications on the mobile device and the accessed other network consumption data for the plurality of other applications;
   select recommended applications for the user to download to the mobile device based on the user profile;
   receive data usage statistics associated with a plurality of the recommended applications from different users,
   determine average data consumption of the recommended applications based on the analysis of the data usage statistics, and
   transmit indications of the determined average data consumption of the recommended applications to the mobile device for display to the user in an application marketplace.

2. The system of claim 1, wherein the data usage statistics comprise total data consumption associated with at least one of the plurality of applications.

3. The system of claim 1, wherein the data usage statistics comprise data consumption during particular intervals associated with at least one of the plurality of applications.

4. The system of claim 1, wherein the data usage statistics comprise at least one of an amount of data consumed, time and date of usage, location of usage, or network interface used in actual consumption by at least one of the recommended applications.

5. The system of claim 1, wherein the processor is further programmed to:
   calculate available data consumption currently remaining in a data usage plan associated with at least one of the one or more computing devices, and
   compare the estimated average data consumption of the plurality of applications based to the calculated available data consumption currently remaining in the data usage plan, and
   rank the plurality of applications based on said comparison.

6. The system of claim 5, wherein the processor is further programmed to provide the recommended applications to an application marketplace that provides an interface for users to download one or more of the recommended applications.

7. The system of claim 1, wherein the data usage statistics comprise data usage for multiple computing devices under a single data usage plan.

8. A method comprising:
receiving network consumption data for applications on a mobile device of a user,
accessing other network consumption data for a plurality of other applications on devices of a plurality of other users;
identifying a user profile for the plurality of other users based on the other network consumption data for the plurality of other applications;
classifying the user with the user profile based on the received network consumption data for the applications on the mobile device and the accessed other network consumption data for the plurality of other applications;
selecting recommended applications for the user to download to the mobile device based on the user profile;
receiving data usage statistics associated with the recommended applications from different users;
determining average data consumption of the recommended applications based on the analysis of the data usage statistics; and
providing the determined average data consumption of the recommended applications for display to the user in an application marketplace.

9. The method of claim 8, wherein the data usage statistics comprise total data consumption associated with at least one of the plurality of applications.

10. The method of claim 8, further comprising comparing the received data usage statistics for the user with the data usage statistics associated with a plurality of user data usage profiles based on similarities in usage patterns of the user and users associated with the user data usage profiles.

11. The method of claim 8, wherein said receiving the data usage statistics comprises receiving data usage statistics for a plurality of users, and further comprising arranging the plurality of users into groups based on the received data usage statistics.

12. The method of claim 8, further comprising:
estimating network consumption for at least one of the recommended applications on two or more networks; and
providing to the user the estimated network consumption for the at least one of the recommended applications on the two or more networks.

13. The method of claim 11, wherein the at least two or more networks comprise a Wi-Fi network and a cellular network.

14. The method of claim 8, further comprising:
identifying a data usage plan of the user;
identifying available data consumption remaining in the data usage plan for the user;
determining an impact to the available data consumption in the data usage plan for downloading at least one of the recommended applications; and
providing to the user the determined impact to the available data consumption in the data usage plan for the user downloading the at least one of the recommended applications.

15. The method of claim 8, further comprising:
identifying a data usage plan of the user;
identifying available data consumption remaining in the data usage plan for the user;
determining an impact to the available data consumption in the data usage plan for running the at least one of the recommended applications; and
providing to the user the determined impact to the available data consumption in the data usage plan for the user running the at least one of the recommended applications.

16. The method of claim 15, further comprising:
identifying a data usage plan of the user;
identifying available data consumption remaining in the data usage plan for the user;
determining an impact to the available data consumption in the data usage plan for either downloading or running the at least one of the recommended applications; and
recommending to the user to change the data usage plan based on the determined impact to the available data consumption in the data usage plan for either downloading or running the at least one of the recommended applications.

17. One or more computer storage memory devices embodying computer-executable components, said components comprising:
a user profile component that when executed causes at least one processor to receive data usage statistics for a plurality of users; and
an application profile component that when executed causes the at least one processor to:
receive network consumption data for applications on a mobile device of a user,
access other network consumption data for a plurality of other applications on devices of a plurality of other users;
identify a user profile for the plurality of other users based on the other network consumption data for the plurality of other applications;
classify the user with the user profile based on the received network consumption data for the applications on the mobile device and the accessed other network consumption data for the plurality of other applications;
select recommended applications for the user to download to the mobile device based on the user profile;
receive data usage statistics associated with the recommended applications from different users,
determine average data consumption of the recommended applications based on the analysis of the data usage statistics, and
transmit indications of the determined average data consumption of the recommended applications to the mobile device for display to the user in an application marketplace.

18. The computer storage memory devices of claim 17, wherein the application profile component further transmits, to the mobile device for display in the application marketplace, the recommended applications ranked according to the estimated average data consumption.

19. The computer storage memory devices of claim 18, wherein the application profile component further visually distinguishes a subset of the ranked recommended applications in the application marketplace as recommended applications.

20. The computer storage memory devices of claim 17, wherein the user profile component further:

obtains information describing at least one data usage plan competing with a current data usage plan of the user, and presents the obtained information to the user.

* * * * *